United States Patent [19]

Hennig

[11] Patent Number: 5,021,271
[45] Date of Patent: Jun. 4, 1991

[54] BELLOWS

[75] Inventor: Kurt Hennig, Munich, Fed. Rep. of Germany

[73] Assignee: Febr. Hennig GmbH, Fed. Rep. of Germany

[21] Appl. No.: 367,879

[22] Filed: Jun. 19, 1989

[30] Foreign Application Priority Data

Jul. 5, 1988 [DE] Fed. Rep. of Germany ....... 3822746

[51] Int. Cl.$^5$ .................................................. F16J 3/04
[52] U.S. Cl. ....................................... 428/36.2; 92/47; 156/298; 156/302; 156/309.9; 428/36.91
[58] Field of Search ................... 92/34, 47; 428/36.91, 428/36.2; 156/298, 302, 309.9

[56] References Cited

U.S. PATENT DOCUMENTS 3,213,764 10/1965 Nelson et al. ........................... 92/47
3,315,704 4/1967 Shire ....................................... 92/47
4,424,834 1/1984 Sumi et al. .......................... 428/36.7
4,745,848 5/1988 Hennig .................................. 92/34

Primary Examiner—James J. Seidleck
Attorney, Agent, or Firm—Thomas, Kerr & Kayden

[57] ABSTRACT

The invention relates to a bellows in which the multilayer cover which forms the bellows body consists of at least one carrier layer, an outer layer and an inner reinforcing layer, and the layers forming the cover are surface welded together.

15 Claims, 2 Drawing Sheets

BELLOWS

BACKGROUND OF THE INVENTION

This invention relates to bellows of the type which are used for the protection of movable parts in machine tools. The bellows body is generally formed by a multi-layer cover. The outer layer of this cover must be resistant in particular to coolants which are often very corrosive. The bellows body also generally has a reinforcing layer on the inside which must be chosen so that it is sufficiently thick to take account of the contamination by shavings to which the bellows is subjected. In the known constructions the reinforcing layer is also provided with perforations which form the pleat lines.

In the known constructions the individual layers of the multi-layer cover of the bellows body are usually connected by stitching or glueing together in zones.

A disadvantage of the known constructions is the relatively high expenditure on manufacturing which is associated with the production of the bellows in the numerous variants which are required.

SUMMARY OF THE INVENTION

An object of the invention, therefore, is to provide a bellows and a method for producing a bellows, which are distinguished by particularly simple manufacture and facilitate the production of bellows in very different variants.

BRIEF DESCRIPTION OF THE DRAWINGS

The invention is illustrated by way of example in the drawings, in which.

DETAILED DESCRIPTION

Figure 1:
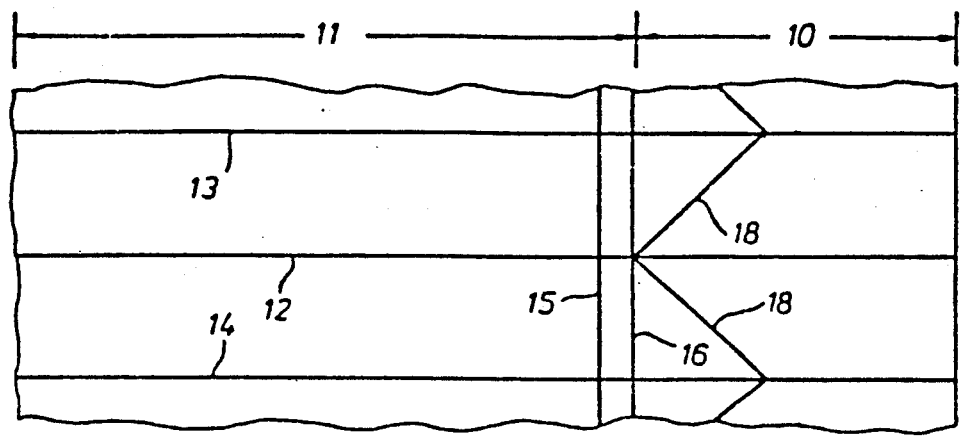
FIG. 1 shows a plan view of a part of the bellows in the extended state.

FIG. 1 shows a cut-away view of the material of the bellows body extended in a plane in the region of one flank 10 and a part of the top 11. The line 12 marks the position of a pleat of the bellows which points inwards and the lines 13, 14 mark the position of the adjacent pleats which point outwards.

In the position in which the flank 10 is pivoted inwards (cf. FIG. 2) pleat lines 15, 16 result in the top 11 projecting a certain distance 17 over the flank 10.

Pleat lines 18 facilitate the pivoting in of the flank 10 with respect to the top 11.

The body of the bellows can be extended in the axial direction and has pleats which point alternately inwards and outwards and run at right angles to the direction of extension, and the bellows can be provided in the region of at least some of the outwardly-pointing pleats with support elements (not shown in the drawings).

Figure 3:
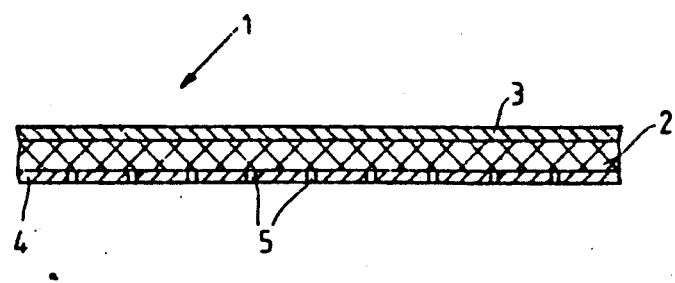
FIGS. 3 and 4 shows sections through two embodiments of the multi-layer cover which forms the bellows body.

FIG. 3 shows an embodiment for the construction of the multi-layer cover which forms the bellows body. This cover 1 contains a carrier layer 2, an outer layer 3 provided on the outer face of the carrier layer 2 and a reinforcing layer 4 provided on the inner face of the carrier layer 2.

The carrier layer 2 is formed by a plastic or natural fibre fabric, preferably a fabric made from polyester or polyamide.

The outer layer 3 is made from weldable plastic, advantageously polyurethane or polyvinyl chloride.

The reinforcing layer 4 is made from weldable plastic. It is provided with perforations 5 which form the pleat markings or pleat lines.

According to the invention the three layers 2, 3, 4 are welded together over the entire surface, which can be done simultaneously for example.

The outer layer 3 can preferably be applied in the form of a film, or as a paste or powder, to the carrier layer 2.

Figure 4:
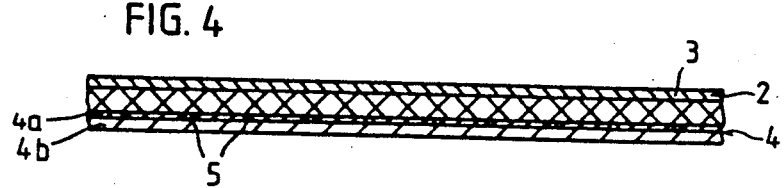

In the embodiment illustrated in FIG. 4, the reinforcing layer 4 consists of two part-layers 4a and 4b. The outer part-layer 4a facing the carrier layer 2 has the pleat markings formed by the perforation 5, whilst the inner part-layer 4b is constructed with a closed surface, i.e. without perforations.

In the production of the cover of the bellows body shown in FIG. 4, the two part-layers 4a, 4b of the reinforcing layer 4, the carrier layer 2 and the outer layer 3 are welded together over the entire surface, and preferably simultaneously.

The two part-layers 4a and 4b of the reinforcing layer 4 are made from weldable plastic material or corresponding fabrics, fleeces or the like. They each have a thickness between 50 and 100 $\mu$m, preferably approximately 100 $\mu$m each. The total thickness of the reinforcing layer is advantageously between 150 and 300 $\mu$m, preferably approximately 200 $\mu$m.

The embodiment according to FIG. 4 has the particular advantage that on the one hand the part-layer 4a which is provided with perforations has a small thickness and thus a good buckling strength, whilst on the other hand the unperforated part-layer 4b is not weakened by perforations and ensures a good hingeing effect (in the region of the pleat lines) and excellent sealing of the entire cover.

Within the scope of the invention it is of course possible for further layers to be used and the most varied materials of the individual layers can be combined with one another. For example, the inclusion of metal layers is conceivable (such as foils, meshes, metallisations).

Figure 2:
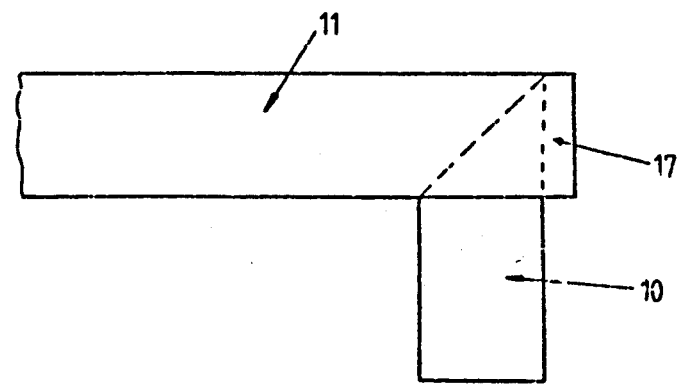
FIG. 2 shows an end view of the pleated bellows body.

FIGS. 1 and 2 show an embodiment of a bellows in which the bellows body is open towards the bottom and thus consists of an upper face and two lateral flanks. However, the invention is also applicable to bellows in which the bellows body has a closed polygonal cross-section.

Figure 5:
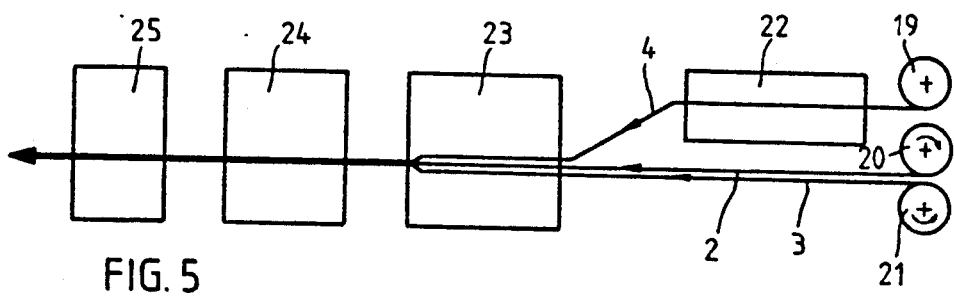
FIGS. 5 and 6 shows schematic representations in order to explain a method for the continuous production of bellows bodies.
Figure 6:
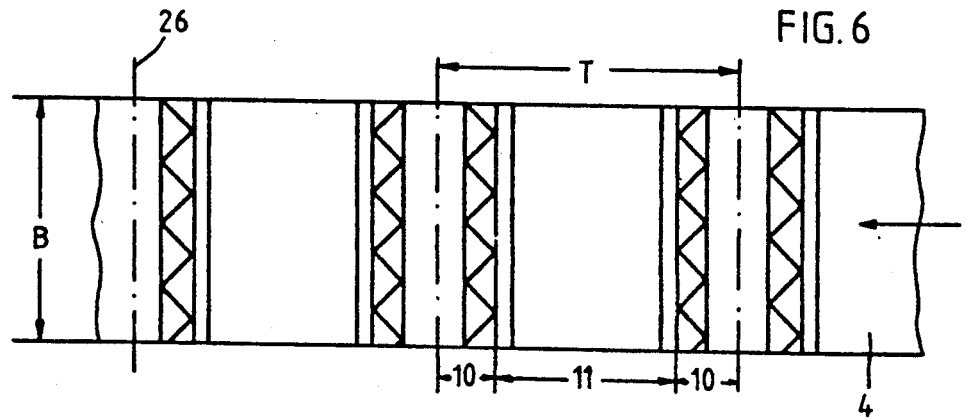

FIGS. 5 and 6 shows an embodiment of the method according to the invention for the continuous production of bellows bodies of the type described.

For the production of the bellows body material on rolls is used, for example in the form of three rolls 19, 20, 21 (for the reinforcing layer 4, the carrier layer 2 and the outer layer 3). The breadth B of this rolled material corresponds to a standard part length of the bellows.

The reinforcing layer 4 first of all runs through a first station 22 in which the necessary stamping out is carried out. FIG. 6 shows the reinforcing layer 4 after it has left the station 22. The piece T corresponds to the material of the reinforcing layer 4 which is necessary for a standard part length of the bellows body. Here (corresponding to the representations in FIGS. 1 and 2) 10 is the region of the flank and 11 the region of the upper face of the bellows body.

Then the carrier layer, the outer layer 3 and the reinforcing layer 4 stamped in the station 22 are introduced into a station 23 which is construction for example in the form of a hot press and in which the three layers are welded together over the entire surface (e.g. by means of plates or rollers).

In a subsequent station 24 the composite body thus formed is cooled before passing to a station 25 where it is cut along the lines 26 indicated in FIG. 6 into pieces which each correspond to the width of the bellows body (spread out in the flat state).

It the pleat markings in the reinforcing layer 4 are formed by perforations, these perforations are produced simultaneously with the stamping operation in the first station 22.

On the other hand, if the pleat markings in the bellows body are formed by indentation or other linear weakening of the material, then the production of these pleat markings can be carried out simultaneously with the surface welding in a station 23.

Other sensible variations of the features and methods described above and explained with the aid of the drawings are, of course, also possible within the scope of the invention. Whereas a continuous method of producing bellows bodies from rolled material is explained with the aid of FIGS. 5 and 6, it is also possible to prepare blanks corresponding to the width of the bellows body from the rolled material at least for one of the layers and introduce them during the course of the process. The stamping of the reinforcing layer in the first station, the subsequent welding together over the entire surface of the carrier layer, outer layer and reinforcing layer in one station followed by cooling of the surface-welded composite body for the cover in a station can then be carried out in a substantially continuous process.

The application of the outer and inner layers to the carrier layer can be carried out by dry lamination (e.g. lining with a film) or wet lamination (application of powder of paste) in each case under the effect of temperature, pressure and cooling. In this way—as explained above—the layers forming the cover are welded together over the entire surface. It is particularly advantageous to provide for the application of temperature and pressure in such a way that the outer layer is welded to the carrier layer over the entire surface and pushed through the carrier layer to a certain extent so that a very extensive welding over the entire surface takes place after cooling. A similar procedure can be used in the welding between the carrier layer and the reinforcing layer. For this type of welding together of the layers forming the cover over the entire surface it is then particularly advantageous if the carrier layer consists—as explained above—of corresponding woven or knitted fabrics or fleece of suitable plastic materials, so that during surface welding the coating materials can penetrate sufficiently deep into the carrier layer or through it.

Although the invention has been disclosed herein by referring to specific embodiments thereof, it will be understood by those persons skilled in the art that other and similar embodiments can be developed which come within the spirit and scope of the invention as set forth in the following claims.

I claim:

1. Bellows in which the bellows body is formed by the bonding of multiple layers of material together to form a multi-layer cover, characterised by the following features:
   (a) a cover including
      a carrier layer having an inner and an outer face and formed by a natural or plastic fiber fabric,
      an outer layer made from a weldable plastic material, adhered to the outer face of the carrier layer,
      and a reinforcing layer made from a weldable plastic material adhered to the inner face of the carrier layer;
   (b) and wherein the carrier layer, the outer layer and the reinforcing layer are welded together over their entire surfaces to form the cover.

2. Bellows as claimed in claim 1, characterized by the following features:
   (a) the reinforcing layer consists of outer and inner part-layers affixed to one another, with the outer part-layer facing the carrier layer and having pleat markings formed by a perforation formed in the outer part-layer, and with the inner part-layer positioned on the opposite side of the carrier layer from the outer part-layer, facing away from the carrier layer and having an unperforated surface;
   (b) the two part-layers of the reinforcing layer, the carrier layer and the outer layer being welded together over their entire facing surfaces to thereby form the cover.

3. Bellows as claimed in claim 1, characterised in that the fabric which forms the carrier layer is selected from the group consisting of polyester and polyamide.

4. Bellows as claimed in claim 1, characterised in that the weldable plastic used to form the outer layer is selected from the group consisting of polyurethane and polyvinyl chloride.

5. Bellows as claimed in claim 2, characterised in that the inner and outer part-layers of the reinforcing layer are each formed from a weldable plastic material.

6. Bellows as claimed in claim 2, characterised in that the inner and outer part-layers of the reinforcing layer each have a thickness between 50 and 100 $\mu$m, the total thickness of the reinforcing layer being between 150 and 300 $\mu$m.

7. A bellows including a bellows body formed in a multiple layer cover shaped in a series of alternately reversed parallel folds that form a series of pleats, said bellows cover including a carrier layer having opposed surfaces, an outer layer attached in flat abutment to one surface of said carrier layer and facing the exterior of the bellows, a reinforcing layer having one surface attached in flat abutment to the other surface of said carrier layer and facing the interior of the bellows, said carrier layer being formed of a material selected from the group consisting of polyester and polyamide sheet material, said outer layer and said reinforcing layer being formed from a weldable plastic material, said outer layer and said reinforcing and carrier layers being welded together over their entire facing surfaces, and said reinforcing layer having a plurality of linearly arranged perforations therein that form the folds of the multiple layer cover.

8. Method of producing a bellows, in which the bellows body is formed by a multi-layer cover, characterised by a carrier layer formed by a natural or plastic fiber, an outer layer made from a weldable plastic and attached to the outer face of the carrier layer and a reinforcing layer made from a weldable plastic and provided on the inner face of the carrier layer and including the steps of guiding the layers in substantially continuous sheets into engagement with one another, heating the layers, and pressing the layers together such that the outer and reinforcing layers partially penetrate the carrier layer to thereby weld the layers to one another over their entire facing surfaces.

9. Method as claimed in claim 8, characterised in that the outer layer is applied to the carrier layer in the form of a film.

10. Method as claimed in claim 8, characterised in that the outer layer is applied to the carrier layer in the form of a paste or a powder.

11. Method as claimed in claim 8, characterised in that for the production of bellows bodies, the materials for the carrier layer, the outer layer and the reinforcing layer are on rolls and are of a width which corresponds to a standard part length of the bellows, and wherein the reinforcing layer is fed from a roll of material into a stamping station and is stamped in the stamping station, and as the reinforcing layer passes out of the stamping station, the carrier layer, outer layer and reinforcing layer are welded together over the entire surface in a welding station and afterwards are cooled in a cooling station.

12. Method as claimed in claim 11, characterised in that the bellows body is produced in a continuous process by receiving a substantially continuous sheet of material from the rolls of material for the individual layers and, after cooling, the rolled material which has been welded together is cut in a cutting station into pieces which correspond to the width of the bellows body.

13. Method as claimed in claim 11, characterised in that blanks corresponding to the width of the bellows body are prepared from the rolled material for at least one layer and introduced into engagement with the other layers during the process.

14. Method as claimed in claim 11, characterised in that the reinforcing layer is provided with pleat markings formed by perforations in a perforation station.

15. Method as claimed in claim 11, characterised in that the reinforcing layer is provided with pleat markings formed by indentations in an indenting station.

* * * * *